United States Patent [19]

Ooga

[11] Patent Number: 4,671,399
[45] Date of Patent: Jun. 9, 1987

[54] FRICTION FACING ASSEMBLY

[75] Inventor: Syougo Ooga, Osaka, Japan

[73] Assignee: Kabushiki Kaisha Daikin Seisakusho, Osaka, Japan

[21] Appl. No.: 835,718

[22] Filed: Mar. 3, 1986

[30] Foreign Application Priority Data

Mar. 4, 1985 [JP] Japan .............................. 60-30650[U]

[51] Int. Cl.$^4$ ............................................. F16D 11/00
[52] U.S. Cl. ................................................. 192/107 C
[58] Field of Search ............ 192/107 C, 70.11, 107 R, 192/107 M, 109 B

[56] References Cited

U.S. PATENT DOCUMENTS

| | | | |
|---|---|---|---|
| 1,862,991 | 6/1932 | Vargha | 192/107 C X |
| 2,888,122 | 5/1959 | Garmager | 192/107 C |
| 3,587,803 | 6/1971 | Sugiura | 192/107 C |
| 4,377,225 | 3/1983 | Lech, Jr. et al. | 192/107 C |
| 4,529,079 | 7/1985 | Albertson | 192/107 C |
| 4,546,866 | 10/1985 | Kamio | 192/107 C |

Primary Examiner—William F. Pate, III
Assistant Examiner—Creighton Smith
Attorney, Agent, or Firm—Armstrong, Nikaido, Marmelstein & Kubovcik

[57] ABSTRACT

A friction facing assembly disposed at a radially outer portion of a clutch disk, comprises a cushioning plate structure of which radially inner portion is fixed to a side plate of the clutch disk and is elastically compressible in an axial direction of the clutch disk; a pair of friction facings fixed to respective surfaces of the cushioning plate structure; and an elastic means arranged between the cushioning plate structure and at least one of the friction facings; said elastic means being adapted to generate hysteresis in axial elastical deformation characteristics of the friction facing assembly.

7 Claims, 8 Drawing Figures

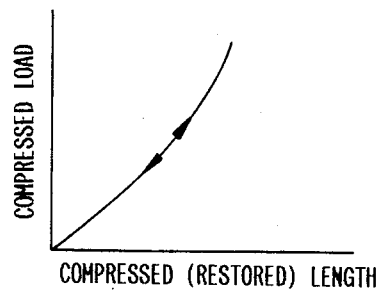
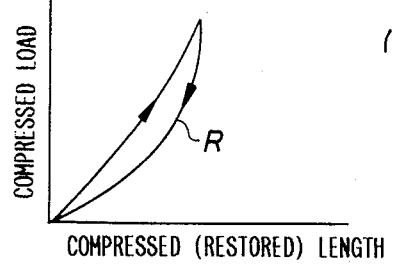
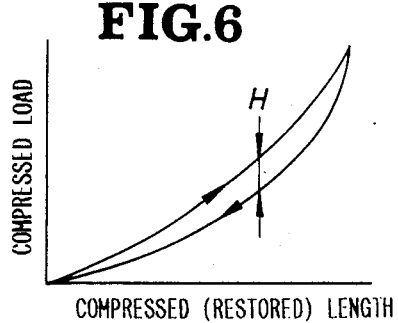
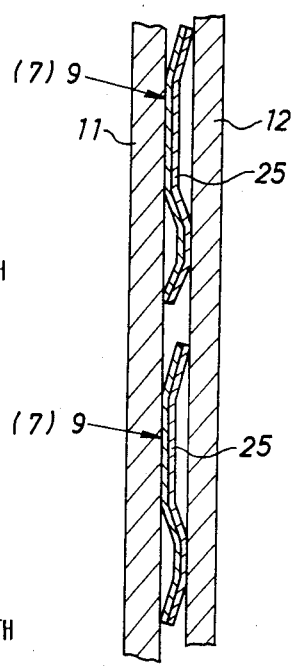
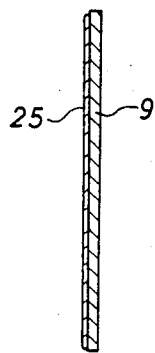

4,671,399

FRICTION FACING ASSEMBLY

BACKGROUND OF THE INVENTION

The present invention relates to a friction facing assembly used in a friction clutch for an automobile and others.

Generally, a friction facing assembly is arranged at a radially outer portion of a clutch disk assembly, and consists of an annularly disposed cushioning plates and a pair of annular friction facings fixed to both surfaces of the cushioning plates. Radially inner portions of the cushioning plates which project radially inward from the facings are fixed to a clutch plate. Generally, each cushioning plate has a configuration which bends or curves substantially in a wave-like form when it is viewed in a radial direction of the disk, so that it can be elastically compressed in an axial direction of the disk. This structure having the axial elasticity can absorb a shock which is generated when the facing is pressed against a flywheel, and thus, can prevent sudden increase of a transmitted torque in the clutch.

However, in said axially elastical facing assembly, axial vibration of the flywheel is transmitted to the facings in a half engaged condition of the clutch, so that noise is generated by the vibration of the facings. Further, the vibration of the facings causes intermittent engagement of the clutch, which prevents smooth start of the vehicle. The vibration of the facings is unpreferably transmitted to a clutch pedal.

Accordingly, it is an object of the invention to provide an improved structure, overcoming the above-noted problems.

SUMMARY OF THE INVENTION

According to the invention, a friction facing assembly disposed at a radially outer portion of a clutch disk, comprises a cushioning plate structure of which radially inner portion is fixed to a side plate of the clutch disk and is elastically compressible in an axial direction of the clutch disk; a pair of friction facings fixed to respective surfaces of the cushioning plate structure; and an elastic means arranged between the cushioning plate structure and at least one of the friction facings; said elastic means being adapted to generate hysteresis in axial elastical deformation characteristics of the friction facing assembly.

According to the above structure, axially elastic characteristics are determined by the cushioning plate structure and the elastic means. In the cushioning plate themselves, the deformation characteristic in the compressing operation is the same as that in the restoring operation. On the other hand, the elastic means has the deformation characteristics including the hysteresis. Therefore, hysteresis is caused in the elastic characteristics of the facing assembly, and thus, the vibration energy of the assembly is absorbed so that abnormal vibration of the facings is prevented.

Other and further object, features and advantages of the invention will appear more fully from the following description of the preferred embodiments of the invention.

BRIEF DESCRIPTION OF THE DRAWINGS

FIG. 4 is a graph illustrating characteristics of cushioning plates;

FIG. 5 is a graph illustrating characteristics of rubber members;

FIG. 6 is a graph illustrating elastic characteristics of a facing assembly of the invention;

FIG. 7 is a fragmentary schematic sectional view of other embodiment of the invention; and FIG. 8 is a fragmentary schematic sectional view of another embodiment of the invention.

DETAILED DESCRIPTION OF THE PREFERRED EMBODIMENTS

Figure 2:
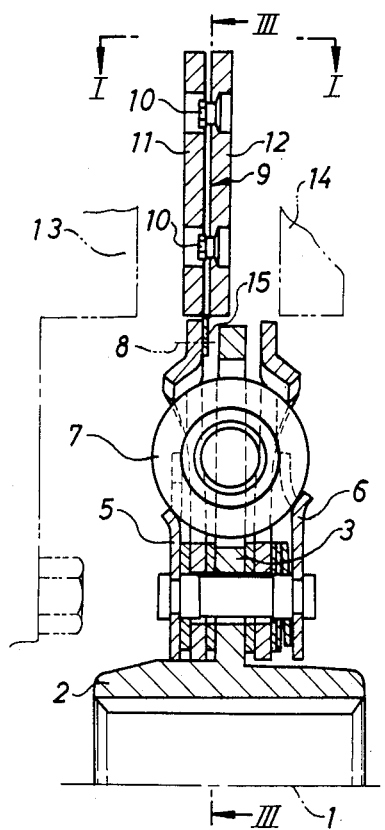
FIG. 2 is a fragmentary schematic sectional view of a clutch including the embodiment in FIG. 1.

Referring to FIG. 2, in a clutch disk, a hub 2 connected to an output shaft 1, only a center line of which is illustrated, is provided with a radial flange 3. A pair of annular side plates 5 and 6 are arranged at respective sides of the flange 3 and are connected to the flange 3 through circumferentially arranged springs 7. A plurality of cushioning plates 9 are annularly arranged at the radially outer portion of the clutch disk. A radially inner portion 15 of each cushioning plate 9 is fixed by rivets 8 to a radially outer portion of the side plate 5, i.e., a clutch plate. A pair of annular friction facings 11 and 12 are fixed to the opposite surfaces of the cushioning plates 9 by rivets 10. The facings 11 and 12 are disposed between a flywheel 13 of an engine and a pressure plate 14 and are adapted to be forced and pressed by the pressure plate 14 onto the flywheel 13.

Figure 3:
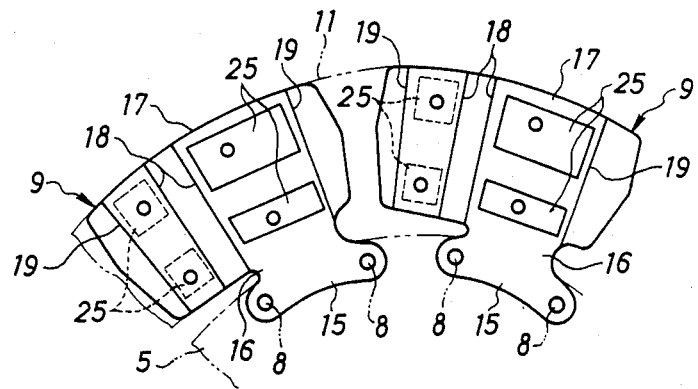
FIG. 3 is a fragmentary schematic view taken along line III—III in FIG. 2.

As shown in FIG. 3, each cushioning plate 9 has a circumferentially narrow portion 16 positioned between the facings 11 and 12 and the side plate 5 as well as a circumferentially long portion 17 positioned radially outside the portion 16. The facings 11 and 12 are fixed to the portions 17. Each portion 17 is provided with circumferentially spaced linear folds 18 and 19 which extend substantially in a radial direction of the disk.

Figure 1:
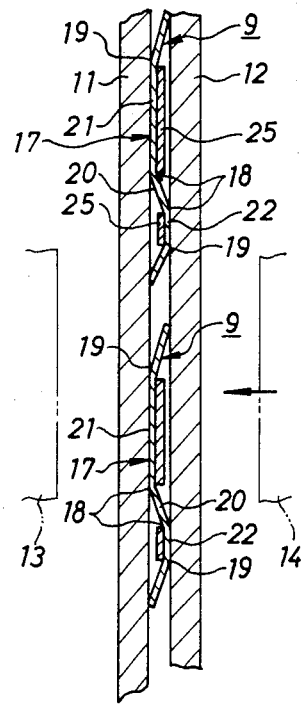
FIG. 1 is a fragmentary schematic sectional view of an embodiment of the invention.

As shown in FIG. 1, which is a schematic sectional view taken along line I—I in FIG. 2, each portion 17 is bent at the folds 18 and 19 so that the portion 17 may have a nearly wave-like configuration as a whole when it is viewed in the radial direction of the disk, as illustrated in FIG. 1. When the facing 11 is pressed onto the flywheel 13, the portions 17 elastically deform into flat configuration and an axially length thereof decreases.

In an illustrated free condition (released condition of the clutch), each portion 17 has two flat portions 21 and 22 and three inclined portions with the folds 18 and 19 therebetween. 20 indicates one of said inclined portions, which is positioned between said flat portions 20 and 21. The portions 20 and 21 are shifted in the axial direction of the disk to each other. The facing 11 is fixed on the surface of the portion 21 and is axially spaced from the other flat portion 22. The other facing 22 is fixed onto the surface of the portion 12 and is axially spaced from the portion 21.

In the illustrated embodiment, a thin plate-like rubber member or members 25 are fixed to the surface faced to the facing 12 of each portion 21 by adhesive or molding. The thin plate-like rubber member or members 25 are also fixed to the surface faced to the facing 11 of the portion 22 by adhesion or molding. The members 25 may be fixed to a plurality of portions of each surface of the portions 21 and 22, as shown in FIG. 3. The one large rubber member 25 may be fixed to the substantially whole surface of each of the portions 21 and 22.

In the above structure, the clutch is engaged by pressing the facing 11 to the flywheel 13 by the pressure plate 14 and is disengaged by releasing the force of the pressure plate 14 to release the facing 11 from the flywheel 13.

In this operation, when the facing 11 is pressed to the flywheel 13, the cushioning plates 9 are axially compressed. When the pressing force by the pressure plate 14 is released, the cushioning plates 9 are elastically restored to the illustrated condition. In accordance with this elastical operation, the rubber members 25 are also axially compressed and restored.

As apparent from the above, a friction facing assembly comprising the facings 11 and 12 and the cushioning plates 9 axially deforms in accordance with deformation characteristics, which are determined by the cushioning plates 9 and the rubber members 25. As shown in FIG. 4, the cushioning plates 9 generally have same characteristics in a compressing operation and a restoring operation. On the other hand, each rubber member 25 naturally shows different characteristics in a compressing operation and a restoring operation. More particularly, as shown in FIG. 5, compressed length changes substantially linearly with respect to change of compressed load in the compressing operation. However, in the restoring operation, as indicated by a curve R, a rate of an increase of a restored length with respect to a derease of a compressed load is small when the compressed load is small, and said rate of the increase of the restored length, i.e., a decrease of a compressed length, with respect to the decrease of the compressed load becomes large when the compressed load becomes small.

Therefore, as shown in FIG. 6, the whole deformation characteristics of the facing assembly has hysteresis H which is caused by said characteristics of the rubber member 25. Consequently, when vibration energy in the axial direction is generated in facing assembly, it can be absorbed, so that abnormal vibration is not generated in the facings.

According to the present invention, as described hereinbefore, the axial vibration of the friction facing assembly is absorbed by utilizing the rubber members 25. Therefore, the abnormal vibration of the facings 11 and 12 can be prevented, and further, contact or interference noise by the flywheel and the facings can be prevented. Intermittent engagement and transmission of the vibration to a clutch pedal can also be prevented.

The present invention can be modified as follows.

As shown in FIG. 7, a rubber member 25 can be fixed on only one side of each cushioning plate 9.

As shown in FIG. 8, the present invention may be used in a friction facing assembly, in which each cushioning plate 9 has a wholly flat portion 17 for supporting facings and is bent at a portion radially inside the facings so that the portion 17 may may be inclined with respect to the radial direction of the disk.

In the structure as shown in FIG. 1, the facings 11 and 12 may be provided with hollows which the rubber members 25 may enter.

Instead of the rubber members 25, other elastic members having deformation characteristics including hysteresis as shown in FIG. 5 may be employed.

Although the invention has been described in its preferred form with a certain degree of particularity, it is understood that the present disclosure of the preferred form may been changed in the details of construction and the combination and arrangement of parts may be restored to without departing from the spirit and scope of the invention as hereinafter claimed.

What is claimed is:

1. A friction facing assembly disposed at a radially outer portion of a clutch disk, comprising a cushioning plate structure of which the radially inner portion is fixed to a side plate of the clutch disk, said cushioning plate having elastically interconnected axially spaced surfaces elastically compressible in an axial direction of the clutch disk and expandable by said elastic interconnection; friction facings fixed to said spaced surfaces of the cushioning plate structure; and an elastic means between the cushioning plate structure and at least one of the friction facings; said elastic means being compressed when said elastically interconnected, axially spaced surfaces are elastically compressed to generate hysteresis in the axial elastical deformation characteristics of said friction facing assembly.

2. A friction facing assembly of claim 1 wherein said elastic means has different elastical deformation characteristics in a compressing operation and a restoring operation.

3. A friction facing assembly of claim 1 wherein said elastic means include a plate-like rubber member fixed intermediate said axially spaced surfaces.

4. A friction facing assembly of claim 1 wherein said cushioning plate structure includes a plurality of annularly arranged cushioning plates, each of which has a nearly wave-like configuration when it is viewed in a radial direction, and said elastic means includes a plurality of plate-like rubber members which are fixed intermediate said axially spaced surfaces.

5. A friction facing assembly of claim 4 wherein each cushioning plate has a flat portion extending in a circumferential direction of the disk and a portion inclined with respect in the circumferential direction, and a plurality of rubber members are fixed to each flat portion.

6. A friction facing assembly of claim 4 wherein each cushioning plate has a flat portion extending in a circumferential direction of the disk and a portion inclined with respect to the circumferential direction, and each of said rubber members is fixed to a nearly whole surface of said flat and inclined portions.

7. A friction facing assembly of claim 1 wherein said cushioning plate structure includes a plurality of annularly arranged cushioning plates, which have portions for supporting friction facings which are inclined with respect to a radial direction of the disk, respectively, and said elastic means is provided on each portion for supporting the friction facings.

* * * * *